US 008705136B2

(12) United States Patent
Jörgens et al.

(10) Patent No.: US 8,705,136 B2
(45) Date of Patent: Apr. 22, 2014

(54) METHOD, COMPUTER PROGRAM AND PRINT SYSTEM FOR TRAPPING PRINT DATA

(75) Inventors: Dieter Jörgens, Baldham (DE); Göran Eiler, Poing (DE); Ulrich Bäumler, Ping (DE); José La Rosa Ducato, Erding (DE)

(73) Assignee: Océ Printing Systems GmbH, Poing (DE)

( * ) Notice: Subject to any disclaimer, the term of this patent is extended or adjusted under 35 U.S.C. 154(b) by 978 days.

(21) Appl. No.: 12/514,612

(22) PCT Filed: Nov. 22, 2007

(86) PCT No.: PCT/EP2007/062690
§ 371 (c)(1),
(2), (4) Date: May 13, 2009

(87) PCT Pub. No.: WO2008/062038
PCT Pub. Date: May 29, 2008

(65) Prior Publication Data
US 2010/0060940 A1    Mar. 11, 2010

(30) Foreign Application Priority Data

Nov. 24, 2006  (DE) .......................... 10 2006 055 587

(51) Int. Cl.
*G06T 5/00* (2006.01)
*G06K 9/40* (2006.01)

(52) U.S. Cl.
USPC .......... 358/3.26; 358/1.9; 358/515; 358/3.27; 358/518; 382/260

(58) Field of Classification Search
USPC .................. 358/3.26, 1.9, 515, 520; 382/260
See application file for complete search history.

(56) References Cited

U.S. PATENT DOCUMENTS

| 4,931,861 A | 6/1990 | Taniguichi |
| 5,251,022 A | 10/1993 | Kitamura |
| 5,542,052 A | 7/1996 | Deutsch et al. |

(Continued)

FOREIGN PATENT DOCUMENTS

| CA | 2 210552 | 3/1998 |
| DE | 199 12 511 | 9/2000 |

(Continued)

OTHER PUBLICATIONS

Reproducing Color Images Using Custom Inks—Stollnitz et al—Jun. 1998.

(Continued)

*Primary Examiner* — David K. Moore
*Assistant Examiner* — Quang N Vo
(74) *Attorney, Agent, or Firm* — Schiff Hardin LLP

(57) ABSTRACT

In a method or system for trapping print data with a plurality of respective objects, the objects being individually transferred into a bit map pixel file, at least one overfill is determined for the respective object relative to color regions bordering the respective object in the pixel file according to predetermined trapping rules. The object and the at least one overfill are inserted into the pixel file, wherein the object and the overfill are rastered in the pixel file upon insertion.

34 Claims, 14 Drawing Sheets

(56) References Cited

U.S. PATENT DOCUMENTS

| | | | |
|---|---|---|---|
| 5,581,667 A | 12/1996 | Bloomberg | |
| 5,666,543 A | 9/1997 | Gartland | |
| 5,768,488 A | 6/1998 | Stone et al. | |
| 5,923,821 A | 7/1999 | Birnbaum et al. | |
| 5,982,997 A | 11/1999 | Stone et al. | |
| 6,028,958 A * | 2/2000 | Kanamori | 382/171 |
| 6,097,498 A | 8/2000 | Debry et al. | |
| 6,236,754 B1 | 5/2001 | Harrington | |
| 6,246,856 B1 | 6/2001 | Kopp et al. | |
| 6,262,747 B1 | 7/2001 | Rocheleau et al. | |
| 6,483,599 B1 * | 11/2002 | Woodman et al. | 358/1.15 |
| 6,549,303 B1 * | 4/2003 | Trask | 358/1.9 |
| 6,559,966 B1 * | 5/2003 | Laverty et al. | 358/1.15 |
| 6,795,214 B2 | 9/2004 | Weinholz et al. | |
| 6,809,839 B1 | 10/2004 | Earl et al. | |
| 7,265,854 B1 | 9/2007 | Hohensee et al. | |
| 7,391,536 B2 * | 6/2008 | McElvain | 358/1.9 |
| 7,436,546 B2 | 10/2008 | Aschenbrenner et al. | |
| 7,522,313 B2 * | 4/2009 | Dalal et al. | 358/3.26 |
| 7,856,140 B2 | 12/2010 | Weiner et al. | |
| 2001/0055130 A1 | 12/2001 | Geurts et al. | |
| 2003/0017934 A1 | 1/2003 | Gottschalk et al. | |
| 2003/0090689 A1 * | 5/2003 | Klassen | 358/1.9 |
| 2003/0123084 A1 * | 7/2003 | Brossman et al. | 358/1.15 |
| 2005/0012946 A1 | 1/2005 | Wilson | |
| 2005/0024668 A1 | 2/2005 | Schmidt | |
| 2005/0099642 A1 | 5/2005 | Segawa et al. | |
| 2005/0213139 A1 | 9/2005 | Mach et al. | |
| 2006/0033959 A1 | 2/2006 | Allen | |
| 2008/0007752 A1 * | 1/2008 | Gandhi et al. | 358/1.9 |
| 2008/0130028 A1 | 6/2008 | Joergens et al. | |
| 2009/0141972 A1 * | 6/2009 | Weiner et al. | 382/163 |
| 2009/0225336 A1 | 9/2009 | Siemens et al. | |

FOREIGN PATENT DOCUMENTS

| | | |
|---|---|---|
| DE | 10 2006 055 587 A1 | 5/2008 |
| DE | 10 2006 055 624 A1 | 5/2008 |
| DE | 10 2006 055 625 | 6/2008 |
| DE | 10 2006 055 626 | 6/2008 |
| EP | 0 484 890 A2 | 5/1992 |
| EP | 0 833 216 | 4/1998 |
| EP | 0 840 500 | 5/1998 |
| EP | 0 929 189 | 7/1999 |
| WO | WO 95/20796 | 8/1995 |
| WO | WO 98/39691 | 9/1998 |
| WO | WO 03/069548 | 8/2003 |
| WO | WO 2004/008379 | 1/2004 |
| WO | WO 2005/001765 | 6/2005 |
| WO | WO 2006/069980 | 7/2006 |
| WO | WO 2007/096283 | 8/2007 |
| WO | WO 2008/062038 | 5/2008 |
| WO | WO 2008/062039 | 5/2008 |
| WO | WO 2008/062041 | 5/2008 |

OTHER PUBLICATIONS

Advanced Function Presentation—Programming Guide and Line Data Reference—Oct. 2000—S544-3884-02.
Data Stream and Object Architectures—Mixed Object Document Content Architecture Reference—Apr. 2001—SC31-6802-05.
Screening Technologies and Print Quality—2002—Chapter 7.
The Principles of Color—Goldmann et al—Chapter 8—2002.
Printing Technologies—2002.
Digital Color Printing—2002 Chapter 10.
Océ PRISMAproduction—2002 Chapter 14.
Print Services Facility for OS/390 & z/OS Introduction—Version,3Release Mar. 30, 2002.
Data Stream and Object Architectures—Image Object Content Architecture Reference—Aug. 2002 SC31-6805-05.
Intelligent Printer Data Stream Reference—Nov. 2002—IBM-S544-3417-06.
Data Stream and Object Architectures—Mixed Object Doc. Content Architecture Reference—Jan. 2004—SC31-6802-06.
TrapPro™ User Manual Harlequin RIP Genesis Release Jan. 2005.
IBM Publication S-544-3884-02 AFP Programming Guide and Line Data Reference Oct. 2000—pp. 1-13.
IBM—Data Stream and Object Architectures—Mixed Object Document Content Architecture Reference—SC31-6802-05 Apr. 2001—pp. 1-31.
Data Stream and Object Architectures—Mixed Object Document Content Architecture Reference—SC31-6802-06—Jan. 2004—pp. 1-29.
Data Stream and Object Architectures—Intelligent Printer Data Stream Reference—S544-3417-06—Nov. 2002—pp. 1-34.
Data Stream and Object Architectures—Image Object Content Architecture Reference—SC31-6805-05—Aug. 2002—pp. 1-20.
Goldman Das Druckerbuch—World of Printers May 2001.
IBM Introduction 3 Release 3.0 G544-5625-03 Mar. 2002.
IBM Data Stream and Object Architectures Intelligent Printer Data Stream Reference—S544-3417-06 Nov. 2002.
IBM Data Stream and Object Architectures—Image Object Content Architecture Reference SC31-6805-05 Aug. 2002.

* cited by examiner

FIG. 6A

Table 1

| X-direction | Range: 0.02 – 5.0 mm<br>0.057 – 14.2 point | Default:<br>0.1 mm |
|---|---|---|
| Y-direction | Same range as in the X-direction | Default:<br>X-value |

Table 2

| X-direction | Range: 0.02 – 5.0 mm<br>0.057 – 14.2 point | Default:<br>0.2 mm |
|---|---|---|
| Y-direction | Same range | X-value |

Table 3

| Trap Step Limit | Range: 0% - 100%<br>The number of droppings is decreased by increasing the value. A minimum step of 5% is suggested | Default:<br>25% |
|---|---|---|
| CMYK | The CMYK dyes are compared on the basis of the relative percentile. The step limit can be different for each colorant | |
| Spot color | The ND of the spot color is compared with the ND of the medium color. (White paper is assumed as a given.)<br><br>The spot color is arranged in a different level than the CMYK level and therefore the percentile of the coverages cannot be compared | |
| Indexed color | The point colorants of the indexed color space are compared on the basis of the relative percentile.<br><br>The step limit can be different for each dye. | |

To FIG. 6B

FIG. 6B

From FIG. 6A

Table 4

| Black (Density) Limit | Range: 0% to 100% of the neutral density of black | Default: 100% |
|---|---|---|
| | 0% - all colors are treated like black. 100% - only black is treated like black | |
| | Spot colors can be treated like black in that the black density limit is set to less than or equal to the neutral density of the spot color | Point |

Table 5

| Black Color Limit | Range: 0.0 - 1.0<br>0.0 (no colorant) to 1.0 (full concentration) | Default: 1.0 |
|---|---|---|

Table 6

| Black Overprint | | Default: |
|---|---|---|
| Text | Range: 0 - 999 point | 12 point |
| Lines | Range: 0.02 - 5.0 mm<br>0.057 - 14.2 point | Black trap width |

Table 7

| Center Trap Limit | Range: 0.0 - 1.0<br>0.0 (no center trap) to 1.0 (all center traps) | Default: 1.0 |
|---|---|---|

From FIG. 6B

Table 8

| Normal | The expansion of the region is in the X- and Y-direction. The expansion at the edge occurs corresponding to the trap width. | Expansion | |
| --- | --- | --- | --- |
| | For example Color 1 (lighter) = yellow, for example Color 2 (darker) = blue, for example | Choke | Clipped Choke |
| Bevel | | | |
| Round | | | |
| Miter<br><br>Default | | | Miter expansion trap |

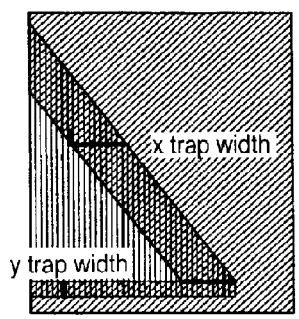
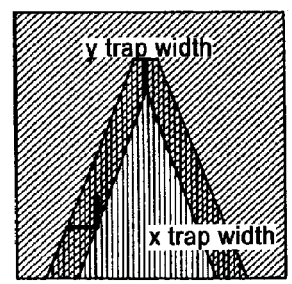
FIG. 7a    FIG. 7b
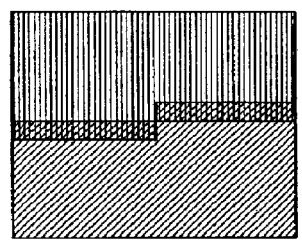
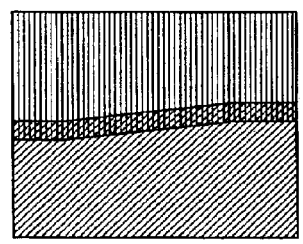
FIG. 8a    FIG. 8b

FIG. 13A

| Offset | Name | Range | Meaning | O/M | Exception |
|---|---|---|---|---|---|
| 0 | Length | X'03 – FF' | Length of the triplet, including this field | M | |
| 1 | TID | X'??' | | M | |
| 2 | Trapping activated | X'01'<br>X'81' | • Trapping activated<br>• Trapping deactivated | M | |
| 3 | Base unit | X'00'<br>X'01' | • 10"<br>• 10 cm | | |
| 4 – 5 | UPUB | X'0001 – 7FFF'<br><br>FFFF | • L-units per base unit<br>Note: X '02D0' = 1 point<br>• Use the L-units definition which is used for the IPDS of which the triplet is a part. | | |
| 6 – End | Possible trapping parameter markings, see below | | | | |

2. Trap width for non-black colors (optional)

| Offset | Name | Range | Meaning | O/M | Exception |
|---|---|---|---|---|---|
| 0 | Length | X'06' | Length of the marking, including this field | M | |
| 1 | TID | X'03' | | M | |
| 2 – 3 | X-direction | | Trap width - X-direction | M | |
| 4 – 5 | Y-direction | | Trap width - Y-direction | M | |

Byte 2 - 3: Trap width in the X-direction: the width is specified in L-units. The value must represent a value in the range from 0.057 to 14.2 points (1/72").

Byte 4 - 5: Trap width in the Y-direction: the same range as for the X-direction.

Given a value X'FFFF', the value from the nearest range below is used as a default value.

3. Trap width for black colors / opaque colorants (optional)

| Offset | Name | Range | Meaning | O/M | Exception |
|---|---|---|---|---|---|
| 0 | Length | X'06' | Length of the marking, including this field | M | |
| 1 | TID | X'04' | | M | |
| 2 – 3 | X-direction | | Trap width - X-direction | M | |
| 4 – 5 | Y-direction | | Trap width - Y-direction | M | |

Byte 2 - 3: Trap width in the X-direction: the width is specified in L-units. The value must represent a value in the range from 0.057 to 14.2 points (1/72").

Byte 4 - 5: Trap width in the Y-direction: the same range as for the X-direction.

Given a value X'FFFF', the value from the nearest range below is used as a default value.

To FIG. 13B

FIG. 13B

From FIG. 13A

4. Trap Step Limit (optional)

| Offset | Name | Range | Meaning | O/M | Exception |
|---|---|---|---|---|---|
| 0 | Length | X'03' | Length of the marking, including this field | M | |
| 1 | TID | X'05' | | M | |
| 3 | TS Limit | X'00 – 64' | Trap Step Limit in % | M | |

Byte 3: Trap Step Limit: The value is indicated in percent.

Given a value of X'FF', the value from the underlying range is used as a default.

5. Black Density Limit (Optional)

| Offset | Name | Range | Meaning | O/M | Exception |
|---|---|---|---|---|---|
| 0 | Length | X'03' | Length of the marking, including this field | M | |
| 1 | TID | X'06' | | M | |
| 3 | BD Limit | X'00 – 64' | Black Density Limit in % | M | |

Byte 3: Black Density Limit: The value is indicated in percent.

Given a value of X'FF', the value from the underlying range is used as a default.

6. Black Color Limit (optional)

| Offset | Name | Range | Meaning | O/M | Exception |
|---|---|---|---|---|---|
| 0 | Length | X'03' | Length of the marking, including this field | M | |
| 1 | TID | X'07' | | M | |
| 3 | BC Limit | X'00 – 64' | Black Color Limit in % | M | |

Byte 3: Black Color Limit: The value is indicated in percent.

Given a value of X'FF', the value from the underlying range is used as a default.

7. Black Overprint (optional)

| Offset | Name | Range | Meaning | O/M | Exception |
|---|---|---|---|---|---|
| 0 | Length | X'03' | Length of the marking, including this field | M | |
| 1 | TID | X'08' | | M | |
| 3 - 4 | BO Text Limit | X'0000 – AFFF' | Text smaller than Note: normal value X'2C10' = 12 point when the L-value per base unit is X'02D0' | M | |
| 5 - 6 | BO Line Limit | | Line smaller than Note: normally identical to the black overfill width | M | |

Byte 3: Black Overprint: The value depends on the size of a character or a line.

Given a value of X'FF', the value from the underlying range is used as a default.

From FIG. 13B

8. Center Trap Limit (optional)

| Offset | Name | Range | Meaning | O/M | Exception |
|---|---|---|---|---|---|
| 0 | Length | X'03' | Length of the marking, including this field | M | |
| 1 | TID | X'09' | | M | |
| 3 | CT Limit | X'00 – 64' | Center Trap Limit in % | M | |

Byte 3: Center Trip Limit: The value is indicated in %.

Given a value of X'FF', the value from the underlying range is used as a default.

9. Trap Edge Shape (optional)

| Offset | Name | Range | Meaning | O/M | Exception |
|---|---|---|---|---|---|
| 0 | Length | X'04 or 08' | Length of the marking, including this field | M | |
| 1 | TID | X'0A' | | M | |
| 3 | Trap Edge | | Trap Edge Shape | M | |
| | | X'01' | • Bevel | | |
| | | X'02' | • Round | | |
| | | X'03' | • Miter | | |
| | | X'04' | • Normal | | |
| | | X'05' | • Diamond | | |
| | | X'06' | • Elliptical | | |
| 4 | Reserved | X'00' | Reserved, should be zero | M | |
| 5 – 7 | Miter limit | | Miter limit | O | |

Byte 3: Trap Edge Shape

Byte 5 - 7: Miter Limit: The parameter is only present if the trap edge shape is of the X'03' type.

Given a value of X'FF', the value from the underlying range is used as a default.

10. Trap Shape (optional)

| Offset | Name | Range | Meaning | O/M | Exception |
|---|---|---|---|---|---|
| 0 | Length | X'03' | Length of the marking, including this field | M | |
| 1 | TID | X'0B' | | M | |
| 3 | Trap Shape | | Trap Shape | M | |
| | | X'01' | • Expansion | | |
| | | X'02' | • Choke | | |
| | | X'03' | • Center | | |
| | | X'04' | • Slide | | |
| | | X'FF' | • Default | | |

Byte 3: Given a value of X'FF', the value from the underlying range is used as a default.

To FIG. 13D

FIG. 13D

From FIG. 13C

11. Slide Trap Limit (optional)

| Offset | Name | Range | Meaning | O/M | Exception |
|---|---|---|---|---|---|
| 0 | Length | X'03' | Length of the marking, including this field | M | |
| 1 | TID | X'0C' | | M | |
| 3 | Slide Limit | X'00 – 64' | Slide Trap Limit, in % | M | |

Byte 3: Slide Trap Limit: Given a value of X'FF', the value of the underlying range is used as a default.

METHOD, COMPUTER PROGRAM AND PRINT SYSTEM FOR TRAPPING PRINT DATA

RELATED APPLICATION

The present application is related to pending U.S. Ser. No. 11/944,097 filed Nov. 21, 2007 titled "Method, Computer Program And Printing System For Trapping Of Print Data, published as U.S. Publication 2008/0130028 on Jun. 5, 2008.

BACKGROUND

The preferred embodiment concerns a method, a computer program and a printing system for trapping print data.

The preferred embodiment is related to other inventions that are described in German patent applications DE 10 2006 055 587.2, DE 10 2006 055 624.0 corresponding to U.S. Published Application 2008/0130028, DE 10 2006 055 625.9 and DE 10 2006 055 626.7. Their content is herewith incorporated by reference into the present specification.

Color documents or document parts (for example images, color graphics or the like) are for the most part described by image data that are organized in color separations. This type of data organization in turn corresponds to many print output methods or apparatuses that print the image data on a recording medium in color separations, for example in the colors yellow (Y), magenta (M), cyan (C) and black (K), or in black and one or more of what are known as highlight color colors or the Océ Custom Tone® colors.

The Assignee OCE Printing Systems GmbH develops and distributes corresponding digital electrographic printing systems. They are described in the publication "The World of Printers, Technologies of Océ Printing Systems", Dr. Gerd Goldmann (Ed.), Océ Printing Systems GmbH, Poing, 7th edition (2002), for example. Various offset and digital printing technologies are described on pages 249-286; various digital color printing systems are described on pages 287-325; and the fundamentals of color printing are described on pages 233-248. The basics of digital image processing are described on pages 209-232. Principles of highlight color printing are described on pages 246-248.

A digital printing system for two-sided, monochrome and/or color printing of a recording medium is known from WO 98/39691. A method for preparing a pixel file in which contiguous regions of the image are determined from the pixels is known from the International Patent Application Nr. PCT/EP2004/00700 (publication number WO 2005/001765 A2).

Methods for trapping image data are known from U.S. Pat. No. 5,581,667, EP-A2-484 890, US 2003/0090689 A1 and US 2006/0033959 A1, U.S. Pat. No. 4,931,861, EP-A2-929 189, DE-A1-199 12 511, US 2001/0055130 A1 and EP-A2-833 216.

There is what is known as the passer problem both in digital printing and in offset printing. Such a problem is known wherein, given multiple printing processes on a sheet of paper, due to mechanical tolerances it cannot be guaranteed that the positioning of the paper in all printing processes is always exactly the same. The problem occurs in monochrome printing when the front and back side are printed separately, or given multicolor printing on one side.

This problem is disruptive given front-and-back side printing when, for example, a border is printed around the front and back sides and these borders do not lie exactly atop one another, which is noticeable when the page is held up to the light.

In multicolor printing the colors are offset relative to one another. As long as the different colors do not touch, this is not conspicuous. If the colors touch, due to the offset of the colors printed over one another at the contact line, this leads to an adulteration of the color impression, or a white gap (flash) remains at the contact line.

While the adulteration of the color impression is for the most part tolerable, the flashes (gaps) are extremely noticeable, as is shown by the comparison of exactly positioned colors in FIG. 1A and colors in FIG. 1B positioned with an offset.

To remedy the flash problem it is known to enlarge or to spatially overfill the brighter color. Although a greater overlap of the colors is therefore achieved, the flashes disappear, as is shown by the comparison of colors in FIG. 2A that are positioned with an offset and overlapped colors in FIG. 2B. Given the enlargement of an object, in the later printing process care must therefore be taken that the overlapping part is printed translucent since otherwise the problem is displaced to the border of the enlarged object.

The method just described that remedies this problem has the name "trapping" (overfilling). Trapping is offered in different products on the market. For example, it is a component of raster image processors (RIPs) of the page description language (PDL) Adobe PostScript® Level 3, the software SuperTrap® offered by Heidelberger Druckmaschinen AG or the software TrapWise® that is offered by Creo.

Trapping can be conducted in two different ways. Trapping can be dealt with at the object level or at the bitmap level.

In electrophotographic high-capacity printing systems the problem of trapping has previously been solved at the bitmap level (see for example WO 2006/069980 A1) since the print data can be automatically processed without delay at the bitmap level. Corresponding trapping methods can therefore be integrated into an electrophotographic high-capacity printing system without the printing operation being negatively affected by this. touch, due to the offset of the colors printed over one another at the contact line, this leads to an adulteration of the color impression, or a white gap (flash) remains at the contact line.

While the adulteration of the color impression is for the most part tolerable, the flashes (gaps) are extremely noticeable, as is shown in prior art U.S. Pat. No. 7,856,140 by the comparison of exactly positioned colors in FIG. 1A and colors in FIG. 1B positioned with an offset.

To remedy the flash problem it is known to enlarge or to spatially overfill the brighter color. Although a greater overlap of the colors is therefore achieved, the flashes disappear, as is shown in prior art U.S. Pat. No. 7,856,140 by the comparison of colors in FIG. 2A that are positioned with an offset and overlapped colors in FIG. 2B. Given the enlargement of an object, in the later printing process care must therefore be taken that the overlapping part is printed translucent since otherwise the problem is displaced to the border of the enlarged object.

The method just described that remedies this problem has the name "trapping" (overfilling). Trapping is offered in different products on the market. For example, it is a component of raster image processors (RIPs) of the page description language (PDL) Adobe PostScript® Level 3, the software SuperTrap® offered by Heidelberger Druckmaschinen AG or the software TrapWise® that is offered by Creo.

Trapping can be conducted in two different ways. Trapping can be dealt with at the object level or at the bitmap level.

In electrophotographic high-capacity printing systems the problem of trapping has previously been solved at the bitmap level (see for example WO 2006/069980 A1) since the print data can be automatically processed without delay at the bitmap level. Corresponding trapping methods can therefore be integrated into an electrophotographic high-capacity printing system without the printing operation being negatively affected by this.

However, the information regarding the objects is missing in dealing with the trapping at the bitmap level, whereby the trapping on the bitmap level is in principle significantly less efficient than the trapping at the object level.

The commercially available products indicated above—which are components of raster image processors (RIPs) of the page description language (PDL) Adobe PostScript® Level 3, the software SuperTrap® offered by Heidelberger Druckmaschinen AG or the software TrapWise® that is offered by Creo—generate additional trapping objects at the borders of the objects, which trapping objects reduce the effect of the passer problems. These additional trapping objects significantly increase the data volume of the corresponding print data file. In extreme cases, it can even increase the data volume tenfold since the number of individual objects can be multiplied. In these known solutions the trapping is executed interactively, such that an experienced user efficiently controls the generation of the additional trap objects depending on the sample to be trapped. However, these methods have proven themselves very well in offset printing, in which normally a great deal of time is available in order to correspondingly process the printer's copy before the printing process and to interactively conduct a trapping.

A method in which a trapping is executed in an electrophotographic printing is known from US 2003/017934 A1. In this method edge lists are produced from the objects, and objects that do not correspond to a predetermined shape can be divided up into corresponding standard shapes. Information of the objects is thus stored with the edge lists before the objects are rastered. The trapping itself occurs at the bitmap level, wherein the additional information of the objects are considered as well (for example in the form of the edge lists). The disadvantage of the trapping at the bitmap level (that information regarding the objects is no longer present) is thus somewhat reduced with this method. However, the generation of the edge list is complicated on the one hand, and multiple objects are additionally generated from single objects, which again makes the processing more difficult. Furthermore, the objects generated in such a manner are no longer identical to the original objects. Objects with complex shapes cannot be processed with this method, or can be processed only to a very limited extent.

A method for trapping of print data present in a print page language (PDL—Page Description Language) arises from U.S. Pat. No. 5,666,543. The print data are hereby initially analyzed, are supplied to a raster image processor (RIP), and trapping instructions are generated. The trapping instructions indicate whether the print data comprise text or graphics and whether they should be trapped using a shape directory in the RIP. The shape directory is generated in the analysis of the print data and transmitted to the RIP. The shape directory is a list of the shapes of the objects. The trapping regions or overfills are generated upon rastering in the RIP. This known method corresponds to the method known from US 2003/017934 A1, wherein the shape directory corresponds to the edge list.

The prior art can thus be summarized to the effect that there are on the one hand trapping methods that trap at the object level. However, these methods are not suitable to conduct the trapping in real time during the printing process in a digital electronic printing machine. These methods are primarily provided for offset printing, in which the image data is processed with an external raster image processor. On the other hand, in digital electronic printers it is known to conduct trapping in real time. However, the trapping here occurs at the bitmap level here, wherein limited information regarding the objects is made accessible to the trapping at the bitmap level by means of edge lists or shape directories.

It has previously been assumed that trapping at the object level could not be implemented in real time in a digital printing machine since a user cannot interactively affect the trapping in the plurality of different rules, and the trapping at the object level generates such a large volume of files that cannot be processed in real time.

Electrophotographic high-capacity printing systems are often components of digital production printing environments in which the pre- and post-processing of printed media is executed with automatic control. The document data are transmitted between the individual workstations in the form of document data streams in such production printing environments.

Different print data streams and printing systems that are suitable for processing the most varied print data streams (including AFP and IPDS) are described in the aforementioned publication "The World of Printers", Dr. Gerd Goldmann (Editor), Océ Printing Systems GmbH, Poing, 7th edition (November 2002), ISBN 2-00-001019-X. In addition to this the print server system Océ PRISMAproduction is described in Chapter 14 (pages 343 to 361), for example. This flexible print data server system is suitable to, for example, receive print data from data sources such as a source computer—the print data being in a specific print data language such as AFP (Advanced Function Presentation), MO:DCA, PCL (Printer Command Language), PostScript, SPDS (Siemens Print Data Stream), in the Portable Document Format (PDF) developed by Adobe Systems Inc. or in the Line Coded Document Data Stream (LCDS) language developed by Xerox Corporation; to convert it into a specific output format—for example into the Intelligent Printer Data Stream (IPDS) format; and to transfer the data in this uniform output format to a print production system. Various technologies for color printing are described in Chapter 10.

In the specification and development of print data streams, the problem sometimes exists that new commands must be inserted into the data stream in order to take into account the technical developments of computers, printing apparatuses and/or post-processing apparatuses. The determination of such extensions is for the most part a relatively complicated process in which various industry partners must cooperate in order to agree on the changes or improvements among one another.

How three new data stream commands (namely WOCC, WOC and END) are added to the Intelligent Printer Datastream™ (IPDS™) is described in U.S. Pat. No. 6,097,498.

An additional possibility to store additional control data in an AFP data stream is to store data in what are known as object containers; see for example pages 93-95 in publication Nr. SC31-6802-05.

Additional techniques to insert new control information into AFP or IPDS data streams is described in WO 03/069548, originating from the assignee OCE Printing Systems GmbH.

How document objects such as text, images, graphics, barcodes and fonts are handled in the AFP and IPDS data streams is described in the IBM publication SC31-6804-05 with the title "Image Object Architecture Reference", 6th Edition (August 2002). For this what is known as an Object Content Architecture (OCA) is defined in which specific data structures and control parameters or parameters characterizing the objects are defined for the respective objects, for example what is known as the Image Object Content Architecture (IOCA) for images, a corresponding GOCA for graphics, a PTOCA for presentation texts etc. The IOCA is described in detail in the aforementioned document. Additional IBM documents helpful in understanding the data streams are cited on pages v through vii of the document.

Details of the document data stream AFP™ are described in Publication Nr. F-544-3884-01, published by International Business Machines Corp. (IBM) with the title "AFP Programming Guide and Line Data Reference". The document data stream AFP was further developed into the document data stream MO:DCA™ which, for example, is described in the IBM publication SC31-6802-06 (January 2004) with the title "Mixed Object Document Content Architecture Reference". Details of this data stream are also described in U.S. Pat. No. 6,768,488. There specific field definitions of the data stream that contain control data (what are known as "structures fields") are also explained.

AFP/MO:DCA data streams are frequently converted into data streams of the Intelligent Printer Data Stream™ (IPDS™) in the course of print production jobs. Such a process is shown in U.S. Pat. No. 5,982,997. Details regarding IPDS data streams are described in the IBM document Nr. S544-3417-06, "Intelligent Printer Data Stream Reference", 7th Edition (November 2002), for example.

IPDS and AFP data streams normally contain and/or reference what are known as resources that contain data that are required to output the documents. Via simple referencing the data of a resource can thereby contain be used multiple times for one or more print jobs that in turn contain multiple documents or document parts, without having to be transferred multiple times. The amount of data to be transferred from a processing unit (for example a host computer generating the documents) to a subsequent processing unit (for example a print server or a printing apparatus) is thereby reduced, in particular when data of a plurality of documents that possess or require the same data in part are to be transferred. Examples of such resources are character sets (fonts) or forms to be overlaid with documents (overlays). The resources can thereby be contained in the document data stream itself or be transferred separate from this between the participating systems and can respectively only be referenced within different documents. It can thereby in particular be provided that the resources are already stored in an apparatus conducting additional processing (for example print server or printing apparatus) so that they do not need to be retransferred with every print job but rather must only be referenced.

In the presentation of AFP document data, resources that are present at various points in the AFP document data stream or originate from various sources are merged with the corresponding variable data of the documents, for example data for invoices that originate from databases, for example billing address, billing number, billing amount etc. The resource data can thereby be integrated into the document data stream as internal resources or be called from libraries as external resources via a resource name. Furthermore, the data are checked for consistency in a parsing process.

Details of how what is known as a line data or MO:DCA document data stream is converted into an IPDS data stream are described in the document "Print Services Facility for OS/390 & z/OS, Introduction", Vers. 3, Release 3.0 Nr. G544-5625-03, March 2002 from IBM. The software program Print Service Facility (PSF) thereby combines variable document data with resource data in order to administer and control output data that are sent to a printer as an output apparatus. Software products under the trade names Océ SPS and Océ CIS that possess corresponding functions are developed and distributed by the applicant.

A method for secure administration and association of resources in the handling of resource-based print jobs is known from US 2005/0024668 A1. A method for processing resource data in a document data stream is known from WO-A1-2004/0008379.

Method for color reproduction in offset printing machines are known from Stollnitz J. et al., "Reproducing Color Images Using Custom Inks", ACM Proceedings of the $25^{th}$ annual conference on Computer graphics and interactive techniques, SIGGRAPH '98, ACM Press, July 1998.

The publications or documents and patent applications cited further above are herewith incorporated by reference into the present specification, and the methods, systems and measures described there can be applied in connection with the preferred embodiment.

SUMMARY

It is an object to achieve a method, a computer program and a system for trapping print data, wherein the trapping can largely be executed automatically. The trapping can in particular be executed in an electronic, digital high-capacity printing system.

In a method or system for trapping print data with a plurality of respective objects, the objects being individually transferred into a bit map pixel file, at least one overfill is determined for the respective object relative to color regions bordering the respective object in the pixel file according to predetermined trapping rules. The object and the at least one overfill are inserted into the pixel file, wherein the object and the overfill are rastered in the pixel file upon insertion.

BRIEF DESCRIPTION OF THE DRAWINGS

FIGS. 6A-6C illustrate tables of individual trapping parameters;

FIGS. 7a and 7b show an overfill in the region of a vertex of an object;

FIGS. 8a and 8b illustrate an overfill in the region of a boundary line with brightnesses varying along the boundary line;

FIGS. 13A-13D show a table of AFP/IPDS trapping parameter triplets.

DESCRIPTION OF THE PREFERRED EMBODIMENT

Figure 1A:
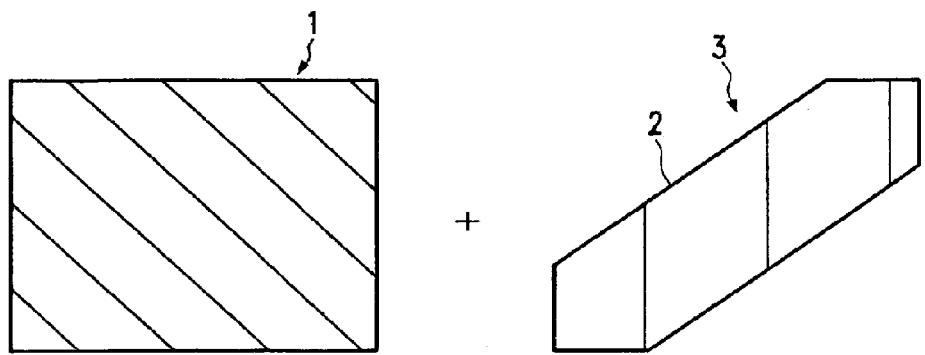
FIGS. 1a through 1c schematically illustrate the insertion of an object into a bitmap file.

For the purposes of promoting an understanding of the principles of the invention, reference will now be made to the preferred embodiment/best mode illustrated in the drawings and specific language will be used to describe the same. It will nevertheless be understood that no limitation of the scope of the invention is thereby intended, and such alterations and further modifications in the illustrated device and method, and such further applications of the principles of the invention as illustrated as would normally occur to one skilled in the art to which the invention relates are included.

In a first aspect of the preferred embodiment to trap print data with a plurality of objects the objects are individually transferred into a pixel file and the following steps are respectively executed:

determine at least one overfill for the respective object relative to the color regions bordering the object in the pixel file, according to predetermined trapping rules, and insert the object and the at least one overfill into the pixel file, wherein the object and the overfill are rastered in the pixel file upon insertion.

By transferring individual objects, the advantage can be achieved that the complete information of the objects can be provided for the calculation of the overfills without producing additional tables or lists about the shape of the objects. Since the overfills in the pixel file are then immediately generated either upon cutting or upon rastering, it is not necessary for the overfills to generate additional objects at the object level. The determination of the overfills using the individual objects with regard to the pixel file and the insertion of the overfills into the pixel file can thus be executed in the print data controller of the printing apparatus without delaying the printing process.

The transfer of individual objects does not necessarily mean that only a single object can be transferred at a specific point in time. It is also possible that multiple objects are transferred in parallel from the print data into the pixel file. Rather, individually means that the objects that are transferred do not spatially intersect with other objects in the image that are simultaneously transferred, such that the calculation of the overfills would hereby be significantly complicated.

The overfills are generated both upon cutting, by reducing the region for the objects to be inserted, and also upon rastering, by expanding the objects with overfills.

Since the objects are individually transferred into the pixel file, the trapping can be executed in a print server and/or print apparatus without delaying the printing process. It is thus possible to trap a print data stream "on the fly".

The method according to the preferred embodiment is advantageously implemented in real time in a print data controller of a printing apparatus.

In a second aspect of the present preferred embodiment that can be applied alone or in connection with the first aspect, a method for trapping of print data with a plurality of objects is provided in which overfills are determined only at edges of one of the respective objects when the brightness of the respective object differs from that of the adjoining region by a difference magnitude that is greater than a predetermined threshold. It is hereby possible to provide no overfills given adjoining objects with similar brightness since these barely show up due to the similar brightnesses. The calculation of a significant number of overfills is thereby foregone, whereby it is simpler to implement the method according to the preferred embodiment in real time. This method is advantageously developed such that overfills are always determined given an object with highlight color color, even if the adjacent object should exhibit a similar brightness, since what are known as the "flashes" (which are narrow white gaps between adjoining objects that should be avoided) are always created given an incorrect registration of an object comprised of a highlight color color.

In a third aspect of the present preferred embodiment that can be applied alone or in connection with the aforementioned aspects, overfills that form in a region of a narrow, long vertex—which overfills form a corresponding vertex, for instance—will not extend beyond a predetermined width of the overfill in the X-direction and in the Y-direction relative to the outermost point of the vertex of the untrapped object. According to this aspect of the preferred embodiment, the overfill can simply be truncated if a specific distance from the spoke is reached. This method can be implemented with the least computing effort. The execution of the method according to the preferred embodiment in real time and without elaborate computing devices is hereby facilitated.

According to a fourth aspect of the present preferred embodiment that can be applied alone or in connection with the aforementioned aspects, a method for trapping of print data with a plurality of objects is provided. The print data are thereby generated together with trapping instructions in a print data stream to execute the trapping, transferred to a print data processing apparatus and/or processed in a print data processing apparatus, wherein the print data stream references resource data that contain trapping parameters and/or trapping instructions.

The print data stream can in particular be transferred to a print data processing apparatus, for example to a printing apparatus. The trapping parameters and/or trapping instructions are advantageously contained in a print data protocol.

A method for trapping of print data with a plurality of objects can also be provided in which print data are transferred together with trapping instructions in a print data stream to execute the trapping in a printing apparatus. The trapping instructions can in particular be contained in a print data protocol. The print data stream thereby references resource data that contain trapping parameters and/or trapping instructions.

The use of the resource structure for the trapping is in particular advantageous when an operator of a printing system adjusts by storing corresponding trapping resources in a print data processing apparatus, for example a print server, a raster processor or a print data controller (arranged in a printing apparatus, for example). The adjustment of this apparatus can thereby advantageously occur individual to a specific trapping method. Furthermore, it can thereby advantageously be that the trapping parameters and/or trapping instructions are not to be retransmitted for every print job to the apparatus executing the trapping.

The fourth aspect of the preferred embodiment can thereby in particular also encompass the generation and administration of corresponding trapping resource data. For example, these can be generated and modified in a host computer, a client or a print server as a file or file collection (library), administered and stored in these computers and be exchanged between them. They can also be exchanged with a printing apparatus with a data stream or independent of a data stream, in particular can be transferred to the printing apparatus or be received from it, be stored, generated, modified or administered in it.

According to a fifth aspect of the preferred embodiment that can be applied alone or in connection with the aforementioned aspects, it is provided that, to trap the print data, the print data are generated, provided and/or transferred in a print data stream together with trapping instructions. The print data stream is thereby structured in different levels, and the trapping instructions possess level-dependent priority rules. The print data stream can in particular be transferred to a print data processing apparatus. It can be transferred to a printing apparatus.

According to a sixth aspect of the present preferred embodiment that can be applied alone or in connection with the aforementioned aspects, and in particular in connection with the fifth aspect, to trap print data the print data are generated in a print data stream, transferred and/or processed in a print data processing apparatus together with trapping instructions. The print data is structured in different levels. The higher the level, the greater its range on which the instructions contained in the respective levels act. According to this aspect of the preferred embodiment, trapping instructions from lower levels have priority relative to trapping instructions from higher levels. A priority instruction can in particular accordingly be provided according to the fifth aspect of the preferred embodiment. The print data stream can in particular be transferred to a print data processing apparatus. It can be transferred to a printing apparatus.

Print instructions (in particular color instructions) are typically passed down from higher levels to lower levels in print data streams. This means that a print instruction at a higher level automatically affects all underlying levels. The print instructions at higher levels thus typically have priority over print instructions at lower levels.

Contrarily, in trapping it is advantageous when the trapping instructions from lower levels have priority over trapping instructions of higher levels since the trapping instructions at a lower level have a more direct relationship to the respective object and thus are more specific to the respective object.

According to a seventh aspect of the preferred embodiment that can be applied alone or in connection with the aforementioned aspects, and in particular with the fifth aspect, the print data in a print data stream are transferred into a printing apparatus together with trapping instructions, and the print data stream are structured in different levels. The higher the level, the greater the range affected by the instructions contained in the respective level. According to this aspect, a trapping instruction with which the trapping can be activated or deactivated in the entire range of the highest level is provided at the highest level. This in particular represents a type of global switch with which trapping can be generally switched on or off. The possibility to basically turn trapping on and off in a print data stream when only the respective trapping instruction is inserted at the highest level is hereby granted to the operator of a printing system. This method can in particular also be used in combination with the methods explained above in which trapping instructions from lower levels have priority over trapping instructions from higher levels, wherein these "switches" at the highest level break this priority rule. In particular, a priority instruction according to the fifth aspect of the preferred embodiment can be correspondingly provided.

In the trapping methods of the different aspects explained above, the method is typically controlled by means of trapping parameters and trapping instructions. In these methods of the different aspect it is appropriate to provide a set of default values (trapping parameters and trapping instructions) in the printing apparatus or, respectively, in its print data controller, according to which set of default values the trapping method can be controlled. Since the trapping method is very much defined by the quality of the printing apparatus, it is appropriate to provide a complete set of such default values so that, in practice, print data are to be transmitted to the printing apparatus with a good deal fewer additional parameters and trapping instructions that individually tune the trapping method to the respective print data.

All of the aforementioned aspects of the preferred embodiment can in particular be advantageously used in connection with the aforementioned Advanced Function Presentation (AFP) data streams and the data streams derived from this, for example MO:DCA or IPDS (which are also called AFP/IPDS data streams in the following).

The pixel file can be a bitmap file formed in the classical sense, in which only one bit of information is provided for each pixel. However, it can also be a bitmap in which every pixel is encoded in multiple bits, for example 4 or 8 bits, in particular in a per-byte coding. Various greyscale values (for example $2^4=16$ or $2^8=256$ greyscale values) can thereby be stored for each pixel, for example. Both types of pixel files are viewed as bitmaps within the scope of the present specification.

In the cited aspects of the preferred embodiment, in particular a host computer or a print server as a generating data processing system can be provided to transfer document data streams between a data processing system generating the document data stream and a data processing system processing the document data stream. The processing data processing system can in particular be designed as a print server, as a computer with a parsing unit and/or as a raster processor, and in particular as a print data controller integrated into a printing apparatus or connected to this. Given the output of the data from a host computer to a print data controller integrated into a printing apparatus via one of the cited systems (for example a print server), this system can in particular convert the data, for example from the MO:DCA format into the IPDS format.

Basic Method Principle

A basic principle of trapping is simple and already known from diverse trapping methods: the lighter colorant is somewhat expanded in the region that should be occupied by the darker colorant. The lighter colorant is darkened by the darker colorant and should no longer be detectable. The darker colorant or the darker color is determinative for the contour of the object.

The method according to the preferred embodiment for trapping print data with a plurality of different objects is subsequently explained using FIGS. 1a through 1c and 2a through 2c.

In principle, the print data exist in a format in which individual objects are defined. These are normally a plurality of objects. Before the trapping of the print data these normally contain objects in vector representation and other predetermined objects. With the insertion of the trapping regions the print data are simultaneously rastered into a bitmap file. In the present method this occurs in that the print data comprising multiple objects and a bitmap file into which the print data are to be transferred are simultaneously stored. The objects are individually transferred into the bitmap file. FIG. 1a shows a rectangle 1 that is contained in a bitmap file and is filled with a color with a predetermined brightness. Furthermore, FIG. 1 shows a bar 2 running at an angle, which bar 2 is an object 3 of the print data. This bar should be inserted into the rectangle 1 such that it extends from the left lower corner of the rectangle 1 to the right upper corner. The bar 2 is lighter than the rectangle 1.

The bar 2 is a component of the print data and is represented in this as a vector object. The bar 2 is thus an object. The rectangle 1 is represented by pixels in the bitmap file. It is therefore not an object.

Figure 1B:
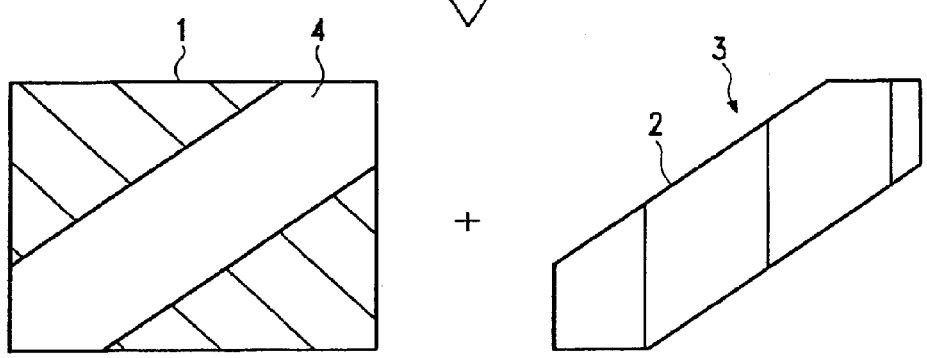

The region 4 into which the bar 2 should be inserted is initially punched out (knocked out) in the rectangle 1 contained in the bitmap file 1 (FIG. 1b). It is hereby avoided that there is an overlap of the colors of the rectangle 1 and the bar 2 over a large area, whereby the color of the variable 2 ends up being true to the original. Since the bar is lighter than the rectangle 1, the knocked out region 4 exactly corresponds to the size of the bar 2.

The object 3 in the shape of the bar 2 is subsequently inserted into the knocked-out region 4 in the bitmap file. The object 3 is hereby rastered into pixels that are entered into the bitmap file at the corresponding points. Since the object 3 is lighter than the bordering rectangle 1, the bar 2 is respectively expanded at the edges by a trapping region or an overfill 5 relative to the dark section of the bitmap file, which trapping region or overfill 5 extends beyond the knocked-out region 4. The contour of the bar 2 is limited by the darker color of the rectangle 1 which is exactly knocked out in the shape of the bar.

Upon rastering the object 3, the trapping regions or overfills 5 calculated in advance using the object have been inserted here.

Figure 1C:
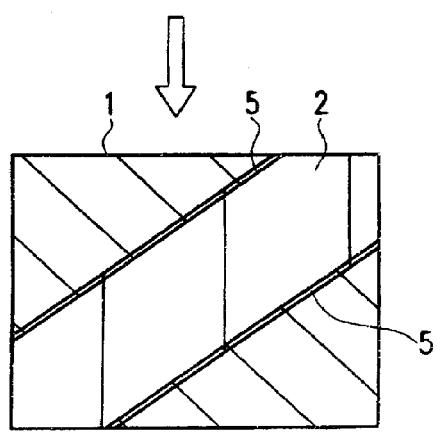

A circle 6 should now be inserted into the center of the rectangle 1 in the image shown in FIG. 1c with the bar 2 crossing the rectangle 1. The circle 6 is filled with a color whose brightness lies between that of the rectangle 1 and that of the bar 2.

Figure 2A:
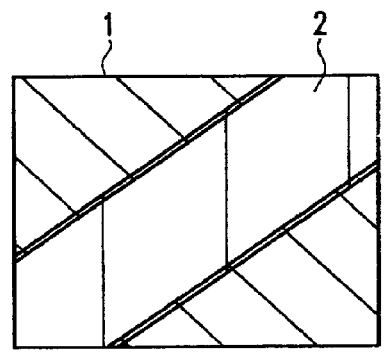
FIGS. 2a through 2c schematically illustrate the insertion of an object into a bitmap file.
Figure 2A:
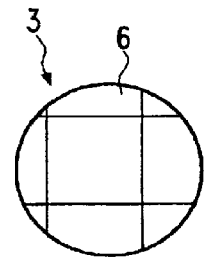
Figure 2B:
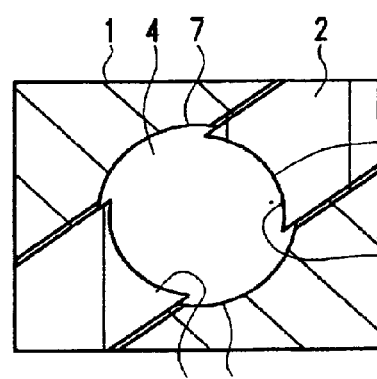
Figure 2B:
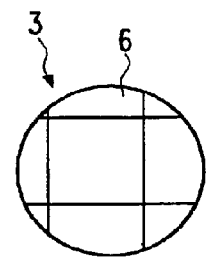
Figure 2C:
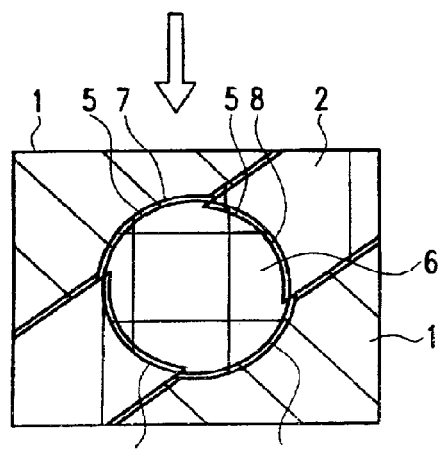

The diameter of the circle 6 is greater than the width of the bar 2, such that the circle extends on both sides beyond the bar 2 into the region of the rectangle 1. Upon knocking out the region 4 for the circle, the edge 7 of the circle adjoining the region of the rectangle 1 is knocked out with exactly the size of the circle, in contrast to which the edge 8 of the circle that adjoins the lighter bar 2 is knocked out with a somewhat reduced size. The bar 2 hereby extends into the region of the circle 6. This region extending into the region of the circle 6 forms an overfill 5 (FIG. 2b).

The circle itself that forms an object 3 in the print data is subsequently inserted into the knocked-out region 4. The circle 6 is hereby rastered into pixels that are entered into the bitmap file at the corresponding points. Since the circle 6 is lighter than the region of the rectangle 1, the edge 7 of the circle 6 adjoining the region of the rectangle 1 is expanded by an overfill 5 that extends into the region of the rectangle 1. Here the contour of the circle is defined by the edge of the dark color of the rectangle 1.

The circle is inserted with exactly its size into the bitmap file at the edge 8 of the circle 6 adjoining the bar 2 since here the darker color of the circle 6 relative to the bar 2 defines the contour of the circle.

The insertion of the two objects (bar 2, circle 6) into the bitmap file is explained above using the same. The objects are hereby individually inserted into the bitmap file, wherein the trapping regions or overfills 5 are calculated at the objects themselves and the knocking-out and insertion of the objects occurs corresponding to the determined overfills. Upon insertion of the objects, these are rastered in the bitmap file.

The principle of the present preferred embodiment was explained above using objects that are filled with a color of predetermined brightness. The expression "color" was hereby used in a simplified sense. In multicolor printing a color is normally composed of multiple colorants (dyes) that are overlaid in different ratios as needed. The individual colorants are handled in separate color separations by the control programs. All color separations are overlaid to generate a complete image. In multicolor printing, the knocking-out occurs through all color separations (planes), in contrast to which the overfills for the individual color separations are determined and inserted separately.

Figure 3:
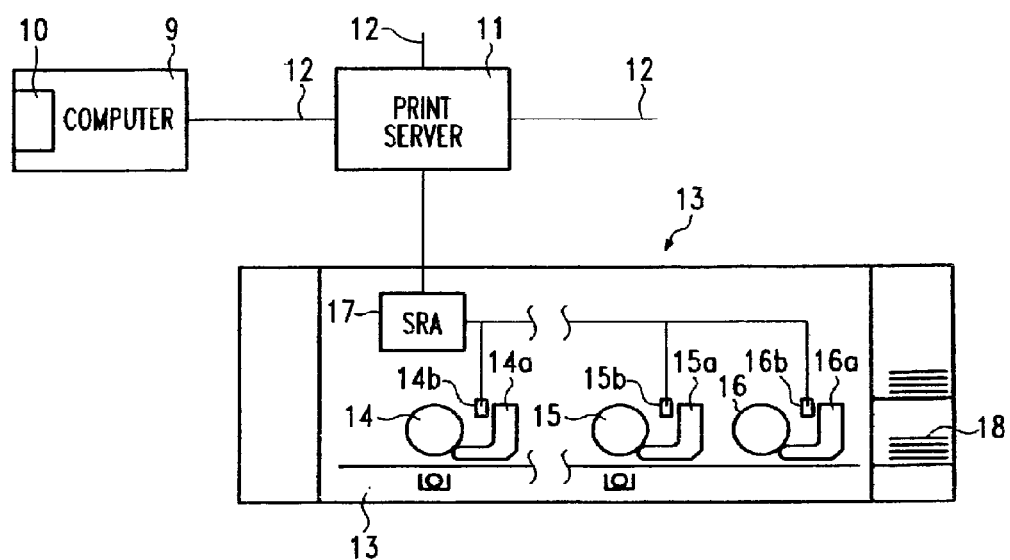
FIG. 3 schematically shows a printing system in a block diagram.

A printing system with which color image data are generated in a software program 10 running on a user computer 9 is shown in FIG. 3. The image data so generated are supplied to a print server 11 as print data. These print data exist in a print data language, for example AFP, PostScript, PDF or PCL. The print server 11 is connected to a network 12 (for example the Internet) and can receive print data from different user computers.

The print server 11 is connected with a printing apparatus 13. Multiple print stations are located in the printing apparatus. Only three printing stations 14, 15, 16 are shown in FIG. 3. A printing apparatus for printing with a highlight color color requires only two print stations; three print stations are required for printing with two highlight color colors, and four to six print stations are required to print in a full color space (YMCK). Each print station comprises a developer station 14a, 15a, 16a, an exposure unit 14b, 15b, 16b (for example a light-emitting diode comb) and additional known electrophotographic components such as a photoconductor drum and a corotron device.

The data received by the print server 11 are received by a scalable raster architecture (SRA) print data controller 17 contained in the printing apparatus 13. The trapping method is executed in real time in the print data controller 17, the print data are rastered into individual pixels and are supplied in true color to the printing groups 14, 15, 16 or the corresponding light-emitting diode combs 14b, 15b, 16b to form a latent image on the corresponding photoconductor drum. The electrostatic images so created are then electrophotographically developed with toner in a known manner and printed on a recording medium 18 (that here comprises single paper sheets).

The raster process in the print data controller can additionally comprise a screening process in which the rastered pixels are prepared specific to a machine before they are output to the light combs 14b, 15b, 16b. The screening process can be downstream of the trapping process or can also be executed in one step with the trapping process or the raster process. The execution in a common step is in particular possible given 1-bit print data (what are known as bi-level print data); the execution in separate steps is normally preferred given print data that are encoded in multiple bits (greyscale value data, what are known as multilevel print data).

Figure 4:
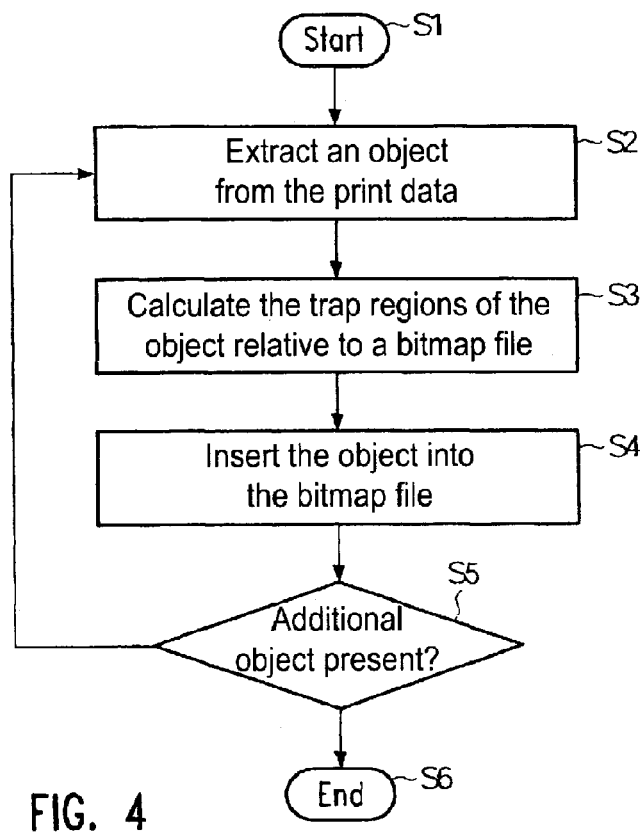
FIG. 4 shows the fundamental workflow of the method according to the invention in a flow chart.
Figure 5:
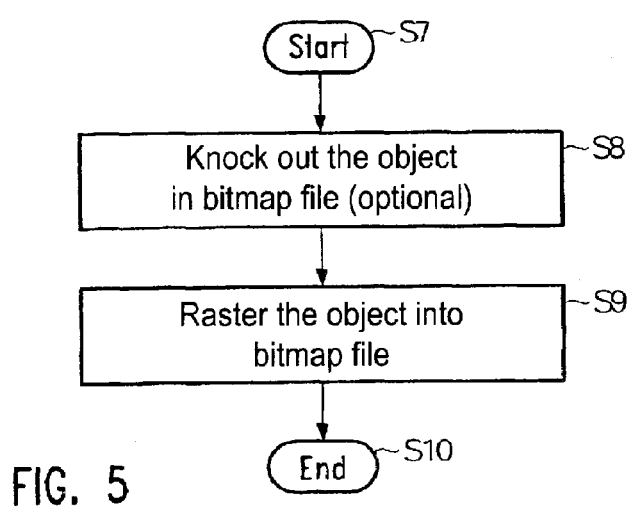
FIG. 5 shows the insertion of an object into the bitmap file in a flow diagram.

The method workflow of the method executed in the print data controller 17 for trapping and rastering of the print data is subsequently explained in detail using the flow charts shown in FIGS. 4 and 5. The method initially starts with Step S1 (FIG. 4). A single object that should be inserted into a bitmap file at the corresponding point at which it is located in the print data is extracted from the print data in Step S2.

Trap regions or overfills of the object are calculated in Step S3 relative to the color regions or greyscale value regions present in the bitmap file and adjoining the object. The rules according to which the overfills are calculated are explained in detail further below.

In Step S4 the object is inserted into the bitmap file, wherein the object is rastered into pixels and the individual pixels are inserted into the bitmap file.

It is subsequently checked whether an additional object is present that is to be inserted into the bitmap file (Step S5). In the event that a further object is present, the method workflow transitions to Step S2. Otherwise the method ends with Step S6. The objects are thus individually transferred into the bitmap file with the present method. The overfills are hereby calculated using the object in relation to the brightness of the color regions of the bitmap file that adjoin the object. This has the advantage that the complete information of the objects is available without the production of additional tables or lists of the shapes of the objects. Since the overfills are generated upon knocking out or rastering in the bitmap file, it is not necessary for the overfills to additionally generate objects at the object level. The determination of the overfills using the individual objects relative to the bitmap file and the insertion of the overfills into the bitmap file can thus be executed without delaying the printing process in the print data controller 17 of the printing apparatus 13.

The insertion of an object into the bitmap file (Step S4) is presented in the flow diagram shown in F*igure* 5. This method workflow begins with Step S7. A region for insertion of the respective object is cut out or knocked out in the bitmap file in Step S8. Overfills that protrude into the region of the object are hereby to be taken into account. For example, such overfills occur when the object to be inserted is lighter than the adjoining color region of the bitmap file. The cutting can also be omitted in specific applications (for example overprinting).

In a subsequent step the object is rastered into the bitmap file, wherein overfills that extend the object into the adjoining regions of the bitmap file are to be taken into account here. For example, this is the case when the object is lighter than the adjoining regions of the bitmap file.

This method workflow is ended with Step S10.

Trapping Rules

In the present method, the neutral density of the respective colorant or of the respective color can be used to decide which colorant or which color is lighter. The neutral density ND is defined in the CMYK color space for a colorant via the following formula:

$$ND = -1.7 \cdot \log(1 - c \cdot (1 - 10^{-0.6d})),$$

wherein d is the specific neutral density of the respective colorant that, for the most part, amounts to 0.61 for cyan, 0.76 for magenta, 0.16 for yellow and 1.70 for black. c is the concentration of the colorant or of the dye with which this is applied on the recording medium. The concentration encompasses a value range from 0 to 1. c is also designated as a degree of coverage.

The neutral density ND for a color results from the sum of the neutral densities of the individual colorants as follows:

$$ND = (ND_C + ND_M + ND_y + ND_K)$$

In the present method, three types of overfills or traps are differentiated: a SPREAD is an overfill in which the lighter color or the lighter colorant is expanded into the darker color or the darker colorants.

A CHOKE is an overfill in which the darker color region is located within a lighter color region, wherein the lighter color region is knocked out in the region of the darker color region so that the darker color region can be reproduced as color-fast as is possible. The overfill of the CHOKE is hereby executed in that the knocked-out region of the lighter color region is reduced, whereupon the lighter color region is in turn expanded into the darker color region.

There is also the case that two different colors or two different colorants that, in spite of their color differences, exhibit the same neutral density are present in two adjoining regions. The overfill that is hereby used is called CENTER or CENTER-TRAP and is symmetrically arranged around the boundary line between the two adjoining surfaces. The original contour is hereby maintained. However, such a CENTER fill is not applied for black or non-transparent or opaque colors or opaque colorants. Given black and other opaque colors, the adjoining colors or colorants are always expanded beneath the black or the other opaque colors.

Different trapping rules are applied depending on the respective type of the colorant or type of the color. All trapping roles are applied given translucent colors (that are also designated as "normal colors" in the following). This also applies for the typically used process colors cyan, magenta and yellow that are translucent.

Transparent colors, in particular transparent varnishes, are not trapped in principle.

Opaque colors are treated like black, meaning that the same trapping rules as for black are applied, according to which the adjoining colorants and colors are expanded under the opaque color.

Special spot colors (for example gold or silver) that lie outside of the gamut of the color space that is used are ignored in trapping. Spot colors are also designated as highlight color colors.

There are many objects that adjoin one another in an image data file. The difference of the neutral density of adjoining regions is calculated so that too many overfills are not generated that, in their entirety, can negatively affect the image. An overfill is generated only if the difference magnitude lies above a predetermined magnitude. This threshold typically lies in the range from 0 to 50% (and advantageously in the range from 5% to 40%) of the degree of coverage with which the colorant is applied on the recording medium. In the scope of the preferred embodiment it is also possible to employ a threshold using the difference of the degree of coverage or the luminance of the adjacent color surfaces instead of the neutral density. This threshold is applied for each individual colorant in multicolor printing.

It basically applies that, the greater the threshold, the fewer overfills that are generated. Therefore, a threshold of at least 20% to 50% has proven itself very well in practice.

Individual specific objects are handled with different trapping rules.

Graphic objects are objects defined by means of vectors, which objects are for the most part filled with a monochrome color. Given two such adjoining objects it is simple to decide whether an overfill or no overfill is to be executed. It is more difficult when the graphic objects are formed in a color gradient. This is explained in detail below.

In principle character objects are handled like graphic objects. However, problems can occur in trapping given small character objects whose stroke width lies below a predetermined limit width, whereby the trapping degrades the legibility of the characters. The width of the character object is therefore compared with the maximum overfill width. In the event that the width of the character object is smaller than twice the maximum overfill width, the overfill width is reduced by a specific amount (for example by 50%). In the event that the width of the object is still smaller than twice the reduced maximum overfill width, no trapping is executed; rather, the character objects are printed as an overprint; this means that they are printed on the background color without the background color being knocked out in the region of the character objects. A knock-out (cut) is thus not executed.

Black objects are treated as opaque objects, such that all other colors or colorants are expanded under these objects. All objects whose neutral density lies above a specific threshold are treated as black objects. This threshold lies in the range from 70% to 100% of the neutral density of black. It advantageously lies in the range from 85% to 95% of the neutral density of black. Highlight color colors can be viewed as black in principle.

From offset printing it is known to generate a "superblack". In electrophotographic printers that print with toner particles, in order to obtain an intense black it can be appropriate to print other colors beneath the black to increase its color density. These other colors are designated as support colors. So that a mis-registration is not visible here, these support colors that are printed below the black colorant are trapped in reverse, meaning that they are pulled in a bit at the boundary region. It is hereby safely prevented that the support colors are completely covered by the black colorant given an incorrect positioning.

Highlight color objects are objects that are comprised of a single, specific colorant. The highlight color normally generates a color impression that corresponds to a mixture of multiple colorants and often lies outside of the gamut that can be achieved with the process colorants. The highlight color color is not mixed with other process colors.

Since the degree of coverage of the highlight color color cannot be compared with the degree of coverage of a color composed of multiple process colors, not the degree of coverage but rather the neutral density of the object is used in calculation of the trapping threshold.

Image objects themselves are normally not subjected to any trapping method. Image objects are trapped at their edges against other adjoining objects. In principle there are four different possibilities here: given center trapping, both the image and the adjoining vector object are trapped. In neutral trapping each pixel is compared with the neutral density of the adjoining vector object and the overfill is executed per-pixel at one or the other side. However, this can result in a diffuse edge impression, which is not desirable.

In dark images a choke image trapping is executed, meaning that the adjoining vector object is expanded under the image. In contrast to this, in light images a spread image trapping is executed, meaning that the image is expanded over the object region.

The preferred trapping rules for image objects is the center trapping, which is also predefined as a standard rule (DE-FAULT). Greyscale value images are handled like color images. No trapping is executed between adjoining image objects.

Since the trapping is executed fully automatically in the present method, certain trapping parameters are to be predetermined. These trapping parameters can be default values stored in the printing system or also individual trapping parameters added to the print document. A set of complete trapping parameters is advantageously stored in the printing apparatus 13 or in its print data controller 17 so that print data can be trapped in the printing system solely with the trapping instruction that a trapping should be executed. This complete set of trapping parameters (default values) can be overwritten or replaced by individual trapping parameters transmitted with the print data stream, or these default values can also be replaced with the resources (explained further below) that can also be stored in the printing system.

Two different sets of trapping parameters are advantageously used in the present method, wherein the one set of trapping parameters controls the trapping parallel to the transport direction of the recording medium in the printer and the other set of trapping parameters controls the trapping transverse to the transport direction of the recording medium in the printing device.

The individual trapping parameters are subsequently explained using the tables shown in FIGS. 6A-6C.

The width of the overfill (trap) is advantageously hard-set. This significantly simplifies the generation of overfills since it must merely be determined whether an overfill should be generated and at which side of the boundary surface between two adjoining objects it should be provided, or whether it should be arranged centered around the boundary line. The width of the overfill normally amounts to one or two pixels. Given a resolution of 600 dpi, two pixels correspond to approximately 1.5 mm. For testing purposes it can be appropriate to set the width of the overfill to a few millimeters, since the overfills at the print image are hereby immediately detectable.

For non-black colorants the width of the overfills is normally 0.02 to 5.0 mm, wherein the same values can be used for the Y-direction and Y-direction (Table 1).

The width of the overfills for black or opaque colorants is normally twice as large as the width of the overfills for non-black colorants (Table 2).

If print data are scaled (i.e. are converted into a larger or smaller scale), the overfills are maintained with unchanged width. A scaling of the width of the overfills is not appropriate.

In the determination of the width of the overfill, each direction of a normal on the boundary line between two color surfaces that either run vertically or in a range between a vertical and a line angled by 45° relative to the vertical is considered an X-direction. The width of the overfill is then set from the boundary line in the direction of the vertical and not in the direction of the normal relative to the boundary line. In a corresponding manner, each direction between a horizontal and a line angled by 45° relative to the horizontal or a horizontally running normal is valid as a Y-direction of a normal situated on a boundary line. The width of the trap here is also set not in the direction of the normal relative to the boundary line but rather in the direction of the horizontal (Y-direction).

In practice this means that the overfill amounts to either one or two pixels in the direction of the vertical (X-direction) or in the direction of the horizontal (Y-direction). Therefore no elaborate calculations of the width of the overfills are necessary, and the overfills can be entered into the bitmap file without great computation effort. This simplifies the trapping method on the fly in the printing apparatus.

Table 3 specifies the rules for the difference amount to assess the brightnesses of two adjacent regions. If the difference of the brightnesses of two adjacent regions is less than the difference amount, no overfills are generated. Each colorant of the object is compared in multicolor space (CMYK). The lighter colorant is multiplied with the respective degree of coverage and is increased by the percentile difference amount; in the event that the lighter colorant increased thusly is darker than the darker colorant multiplied with the same degree of coverage, no trapping is then necessary. This comparison is executed between all colorants of the adjoining regions. If a comparison results in the necessity of a trapping, a trapping is executed.

Colors with a neutral density above a predetermined density limit (black density limit) are treated like black. The default value lies at 100% (Table 4). However, in some cases it can be appropriate to decrease the density limit, for example to a range from 85% to 95%.

Table 5 shows the black-color boundary that specifies as of which degree of coverage the color black is to be considered as black and not as a grey color tone. The default value is 1.0. However, values between 0.85 and 1 (in particular between 0.85 and 0.95) are also reasonable.

Small black objects such as characters or lines are often better printed on other objects without their region being knocked out. This overprinting requires significantly less computing power than a knock-out and generation of an overfill. An overprinting is normally made when the text is smaller than a predetermined size (12 pt) or lines are smaller than the width of the overfill for the color black. The corresponding ranges of the limit values are specified in Table 6.

A center trap is normally generated only when the neutral density of the two adjoining regions is the same. With a center trap limit the range within which a center trap is generated can be expanded. The center trap limit encompasses the range from 0.0 to 1.0 (Table 7). The center trap limit is applied in that the neutral density of the darker color is multiplied with the center trap limit; in the event that the product is smaller than the neutral density of the lighter color, a center trap is then generated.

Table 8 shows a few shapes of the overfills, normal overfills for spread and choke that are also clipped at the boundary region (meaning that the overfill that extends into the adjoining color region does not project beyond this adjoining color region). Overfills with bevel, a round and miter are also shown.

Given mitering the problem exists that an overfill with a very narrow, long vertex is created at small angles. It is suggested to truncate a miter overfill when it extends in the region of the vertex beyond the respective width of the overfill in the X-direction or in the Y-direction. This is shown in FIGS. 7a and 7b using two examples. This boundary of the miter vertex incurs almost no computation effort; it is independent of the orientation of the miter angle. It can be determined very quickly and does not delay the calculation of the overfills. The method can therefore be executed quickly and with a saving of resources without a great computation effort.

If two regions whose brightnesses gradually vary adjoin one another, it can be such that, at one boundary line, the one boundary surface at one segment and the other boundary surface at the other segment is lighter relative to the respective other boundary surface. This leads to the situation that the overfill extends into the one region at the one segment and into the other region at the other segment. This change can be executed discontinuously, or a gradual transition can also occur. To set this transition a sliding trap limit is provided that comprises a numerical range from 0.0 to 1.0. If the value of the sliding trap limit is 1.0, the transition between the two overfills occurs discontinuously (FIG. 8a). Given smaller values of the sliding trap limit, the overfill shifts gradually over the boundary line of the adjoining color regions. FIG. 8b shows a gradual transition for a sliding trap limit of approximately 0.5.

To reduce the visibility of an overfill, this can be scaled (trap color scaling). In the region of the overfill the degree of coverage is reduced by a scaling factor. The scaling factor can assume values in a numerical range from 0.0 to 1.0. It is also possible that different scaling factors are provided for different colorants. The default value of the scaling factors is 1.0. A scaling factors of 1.0 means that the overfill always exhibits the degree of coverage of the darker colorant, contrary to which a scaling factor of 0.0 means that the overfill always exhibits the degree of coverage of the lighter colorant. This scaling factor is applied to the difference of the degree of coverage of the darker and lighter colorant and is added to the degree of coverage of the lighter colorant. It can hereby be prevented that the overfills are too dark or too light.

Implementation of the Method for Trapping Print Data in an AFP/IPDS Data Stream

Figure 9:
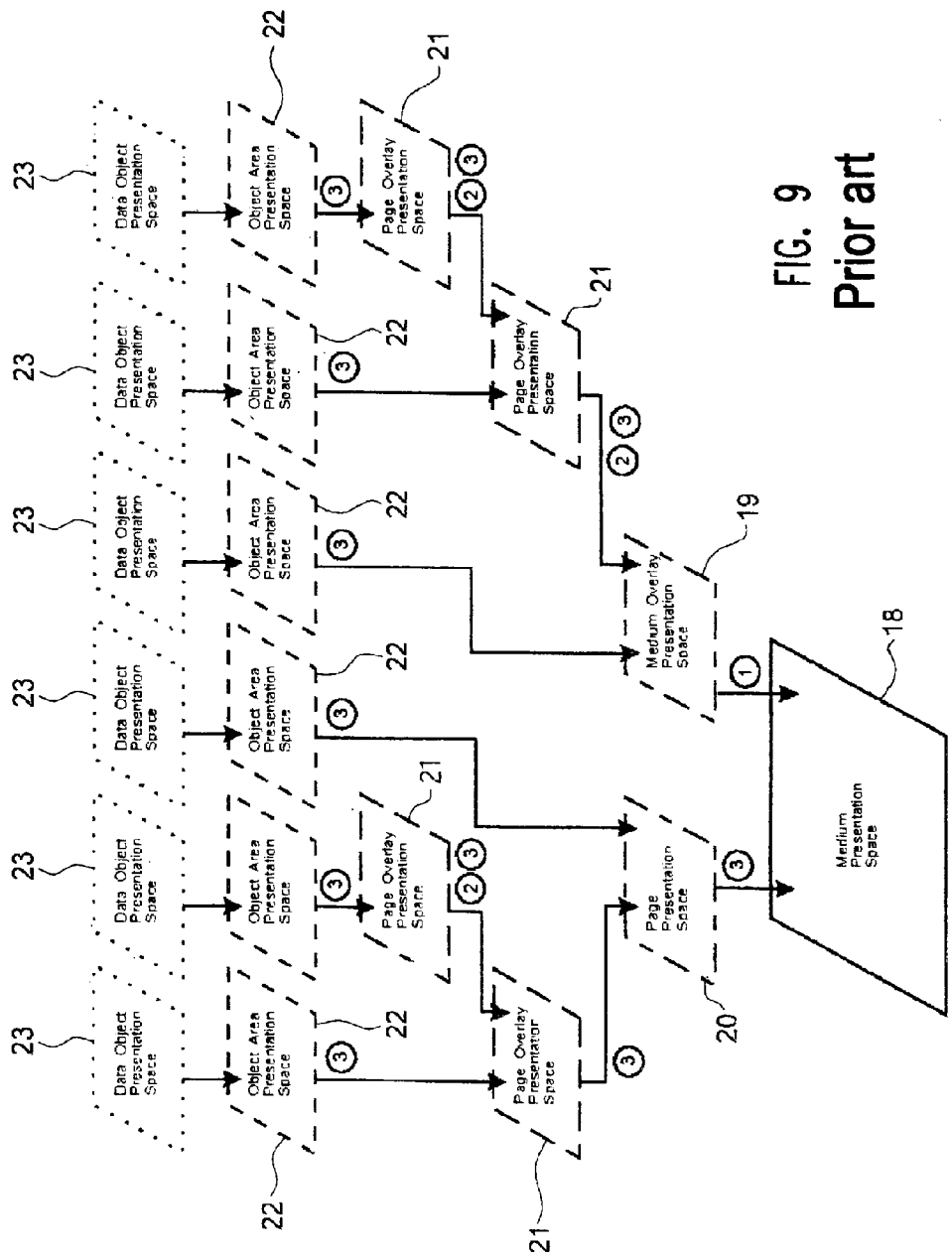
FIG. 9 schematically shows an example of a hierarchical structure of an IPDS print data stream.

The IPDS print data stream is explained in detail in the IBM publication "Intelligent Printer Data Stream, Reference" S544-3417-06, 7th Edition (November 2002). In this publication a diagram is listed on Page 31 that is shown attached as FIG. 9. This diagram shows an example of the hierarchical structure of an IPDS print data stream with multiples of what are known as presentation spaces. These presentation spaces respectively define a specific region in a document to be printed. Multiple presentation spaces can be superimposed on one another.

The highest level in the hierarchy of the presentation spaces forms a medium presentation space 18 that defines the print data medium or, respectively, the print medium. This medium presentation space is a limited address space in the print data stream that is mapped to a complete page of the print data medium. There is thus only a single medium presentation space 18 on one side of a print data medium. The print instructions and print data contained in the medium presentation space thus apply for the entire side.

Furthermore, there is a medium overlay presentation space 19, a page presentation space 20, page overlay presentation space 21, object area presentation space 22 and data object presentation space 23.

All presentation spaces can contain print data and print instructions. The lowest level of the presentation spaces represents the data object presentation spaces 23 in which the data objects (graphics and texts) to be printed are contained. These data object presentation spaces 23 are linked (merged) with the object area presentation spaces 22 that are provided for special objects. The object area presentation spaces 22 are in turn merged with page overlay presentation spaces 21. In principle overlays can consist of any arbitrary combination of text, image graphics, barcode and what are known as object container data. Overlays are normally used as a type of form into which the data objects of the lower levels can be inserted.

The order in which the individual presentation spaces are linked with one another is established exactly.

In principle, trapping instructions of a lower level have priority over trapping instructions with regard to a higher level since the print instructions in the lower level have a more direct relationship with the respective object.

At the highest level (the medium overlay presentation space) a trapping instruction "global trapping enabling/disabling information" is provided with which the trapping of the print data stream can generally be switched on and off. This trapping instruction breaks the priority rule explained above, according to which trapping instructions of lower levels have priority over trapping instructions of higher levels. It allows an operator of the printing system to basically switch the trapping on or off in a simple manner in that this trapping instruction is simply inserted at the uppermost level.

The trapping instructions can be defined separately with a trapping triplet in each presentation space that is explained in detail further below. The trapping instructions in the individual presentation spaces can hereby be individually regulated. In principle it also applies here that the trapping instructions of one presentation space of a lower level can overwrite (overrule) a corresponding trapping instruction of a presentation space of a higher level. Deviating from the typical practice of the IPDS data stream, the trapping can hereby be controlled at the lower levels (for example the data object presentation spaces), and this trapping instruction cannot be modified by presentation spaces provided at higher levels. A user who generates a data object to be printed can hereby unambiguously and irrevocably establish whether and how this data object is subjected to the trapping process. There are data objects in print data that in general may never be subjected to a trapping process. Such data objects are barcodes, for example. If barcodes were subjected to a trapping method, the stroke width of the individual barcodes would then be altered, whereby the meaning of the barcodes would be lost. Even if a trapping should be provided at presentation spaces arranged at higher levels, data objects in which the trapping method is activated at the level of the data object presentation space are not subjected to a trapping method.

All trapping parameters do not have to be defined in a print data stream. Trapping parameters not defined in a print data stream are supplemented by default values stored in the printing apparatus 13 or in the print data controller 17. In practice it is appropriate to establish as few trapping parameters in the print data stream as possible since the trapping method is very printer-specific. The offset of the individual color separations on a print data medium normally depends on the mechanical properties of the printing apparatus, such that in principle trapping parameters (for example the width of an overfill) are best established in the printing apparatus 13. Only trapping parameters that are specific to the print data themselves (for example the deactivation of the trapping method for barcode objects) should be defined in the print data stream.

The principle of the supplementation of the trapping parameters with default values in the printing apparatus allows the creation of the print data stream to be kept simple since only a few, basic and general trapping parameters are defined in the print data stream and are supplemented in the printing apparatus by additional, specific trapping parameters.

According to the preferred embodiment, the resource structure of the AFP data stream and of the IPDS data stream is used to control the trapping process. Print data are generated at the user computer 9 (FIG. 3) and transmitted to a print server 11 by means of the AFP data stream. The AFP data stream is prepared in the print server 11 and converted into an IPDS data stream for output at the printing apparatus 13. For this multiple processes that are controlled by software modules run in the print server 11. A first software module integrates resource data (for example fonts or overlays) that are called in to the original print data stream into said print data stream. A second software module, the parsing module, checks the print data stream for consistency with predetermined rules. A pre-parsing process (which is upstream of the parsing process) is implemented by a corresponding software module, in which pre-parsing process an identification datum is associated with every resource call and the associated resource file in addition to the resource name, via which identification datum the resource is uniquely identified relative to all other resources of the document data stream. Within the document data stream the resource can then be called once or multiple times by means of the resource name and/or the identification datum to show the print data and the resource data at the printing apparatus 13. The processes shown here in the print server can also be implemented partially or entirely in the print data controller 17 of the printing apparatus 13.

In the shown exemplary embodiment, the AFP document data stream contains documents that correspond to the MO:DCA standard and that contain respective reference data regarding data objects that are available via the print server 11 and in the print data controller 17. The resource data can thereby be transferred from the application computer 9 to the print server 11 and the print data controller 17 separate from the MO:DCA document data stream, or are already stored in the print server 11 and in the print data controller 17 as external resources. However, the resource data can also be transferred together with the document data stream from the user computer 9 to the print server 11 as embedded resource data (what are known as inline resources). Additional details of a corresponding data processing are described in WO-A1-2004/0008379, which is incorporated by reference into the specification at this point for this. The resource data can contain what are known as data object resources that contain object data which are in particular referenced multiple times in an identical manner in the document data stream. For example, such data objects can be image data, text data, graphic data and/or trapping data. The reference to the object resources can occur via an object resource library that contains characterizing data regarding the object as well as data about the storage location of the corresponding object data. The library comprises a data object resource access table (RAT) that, for the print server 11, acts as an index table for the access of the print server to the resource data.

The print server 11 receives the MO:DCA document data stream from the apparatus computer 9, converts it into an IPDS document data stream and sends this to the print apparatus 13. In the course of the data conversion it reads the reference information (name) of a data object from the MO:DCA document data stream and accesses the stored data resource with the aid of the data object resource access table (RAT). The complete data of the object are then integrated into the IPDS data stream and are sent to the printing apparatus 13. This method can be applied just as well when the data are sent to a different output apparatus (for example to a color monitor) instead of to a printing apparatus.

An MO:DCA document data stream is structured in data elements that are largely self-explanatory. Structured fields are important components of the MO:DCA structure. A structured field is divided into multiple parts. A first part (introducer) identifies the desired command, specifies the total length of the command and specifies additional control information, for example whether additional filler bytes (what are known as padding bytes) are present. The data contained in a structured field can be encoded as fixed parameters, contain repetition information (repeating groups), keywords and what are known as triplets. The fixed parameters deploy their effect only for the structure in which they are contained. Repeating groups specify a grouping of parameters that can occur multiple times. Keywords are self-explanatory parameters that typically comprise two bytes, wherein the first byte is an identification byte for the keyword and the second byte is a data value characterizing the keyword. Triplets are self-explanatory parameters that contain a length specification in a first byte, an identification information characterizing the triplet in a second byte and then up to 252 data bytes. What are known as data structures of an MO:DCA document data stream define a syntax that can be evaluated in the course of a parsing process and can be flexibly expanded.

MO:DCA data streams are similarly hierarchically divided like the IPDS data streams explained above.

The resource data can be generated at different points: the user computer 9, the print server 11 and even by means of a control panel at the printing apparatus 13. These resource data are sent once to the print data controller 17 of the printing apparatus 13 and are stored there so that they can always be reused when a corresponding print data stream references them.

The possibility to create specific trapping settings once as resource data and to store them at the print data controller 17 where they can then be repeatedly recalled hereby exists for a user of the user computer 9 or operator of the print server 11.

Figure 10:
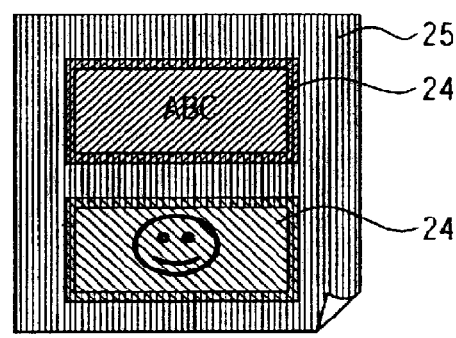
FIGS. 10, 11, 12 illustrate trapping examples in a print data stream.

Some trapping examples in an IPDS print data stream are subsequently explained:

FIG. 10 shows an example in which two presentation spaces 24 are respectively filled with a uniform dark background color and are linked with an underlying presentation space 25 that is filled with a lighter color. Here overfills are to be generated at the edge of the presentation spaces 24 since here color regions of different brightness abut one another. A trapping instruction in the presentation space 24 regulates the manner of how the trapping is executed at the edge at the presentation space 25.

Figure 11:
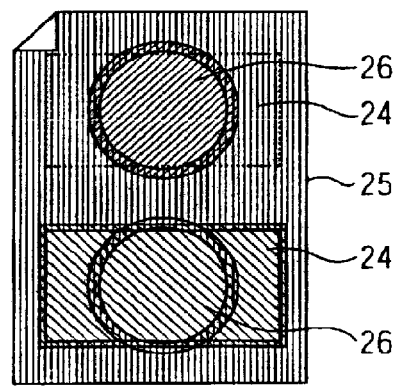

A similar example with two presentation spaces 24 is shown in FIG. 11 in which a circular element (data object presentation space 26) is respectively arranged. The upper presentation space 24 is transparent, i.e. not filled with a background color. This presentation space 24 contains an instruction that the trapping of objects contained therein is to be conducted with underlying presentation spaces.

In contrast to this, the lower presentation space 24 is filled with an opaque background color such that the circular element 26 is to be trapped against the presentation space 24 and not against the underlying presentation space 25.

It can also be desirable to use different trapping rules for different elements within one presentation space, for example for different graphic elements (GOCA) that are filled or possess empty borders. "Trapping Drawing Orders" and "Trapping Text Controls" are provided for such cases.

Figure 12:
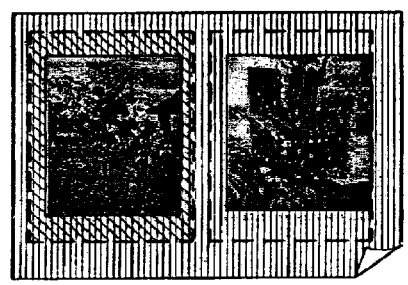

In multilevel images contained in IOCA presentation spaces, no trapping is executed in principle since they are considered as opaque objects. A trapping here occurs merely at the edges of the image or at the edges of the IOCA presentation space when this is filled with a background color (FIG. 12).

FIGS. 13A-13D show the AFP/IPDS trapping parameter triplets in table form, wherein the triplet (offset, name, range) is specified in the respective first three columns. The meaning of the triplet is explained in the fourth column. In the fifth column it is specified whether the triplets are optional or mandatory. Exceptions are indicated in the sixth column.

The trapping is conventionally dependent on the paper travel direction. The trapping parameters in the paper travel direction therefore often differ from those transversal to the paper travel direction. In the trapping parameter triplets, the Y-direction always means parallel to the paper travel direction and the X-direction is rotated by 90° transverse to the paper travel direction. In the event that an object is rotated, the print data controller automatically applies the parameter of the corresponding direction.

An L-unit is typically defined as a unit of measurement in an IPDS data stream. This L-unit can be defined differently for the trapping parameters. Some abbreviations are listed in the tables. They mean:

TID Trapping ID
UPUB L-Units per UnitBase
TS Limit Trap-Step Limit (difference amount)
BD Limit Black Density Limit (density limit)
BC Limit Black Color Limit
CT Limit Center-Trap Limit
TCS Trap Color Scaling (scaling factor)

The trapping method is primarily executed in real time in the print data controller 17 (FIG. 3) so that the print data are supplied without delay in the printing process. The print data controller 17 does not necessarily need to be integrated into the printing apparatus 13 but rather can also be arranged outside of the printing apparatus 13, for example as a separate raster image processor (RIP). The print data controller 12 can comprise special hardware circuits, for example FPGAs (Freely Programmable Gate Arrays) or ASICs (Application Specific Integrated Circuits). It can also be operated on a typical computer (data processing apparatus), for example a personal computer with one or more Intel® Pentium Processors or another processor system with suitable operating system. It can furthermore be provided with a microprocessor in which an executable computer program is stored that is designed to execute the method according to the preferred embodiment. This computer system can naturally also be stored on a data medium independent of the printing system.

The preferred embodiment is in particular suitable to be realized as a computer program (software). It can therefore be distributed as a computer program module, as a file on a (for example a diskette or CD-ROM) or as a file via a data or a communication data medium network. Such and comparable computer program products or computer program elements are embodiments of the preferred embodiment. The workflow according to the invention can be applied in a computer, in a printing apparatus or in a printing system with upstream or downstream data processing apparatuses. It is thereby clear that corresponding computers on which the preferred embodiment is applied can contain additional, known technical devices such as: input means (keyboard, mouse, touchscreen); a microprocessor; a data or a control bus; a display device (monitor, display); and a working memory; a hard disk storage; and a network card.

Although a preferred exemplary embodiment has been shown and described in detail in the drawings and in the preceding specification, it should be viewed as merely exemplary and not as limiting the invention. It is noted that only the preferred exemplary embodiment is presented and described, and all variations and modifications that presently and in the future lie within the protective scope of the invention should be protected.

We claim as our invention:

1. A method for trapping print data comprising at least first and second objects where the first object is to be inserted at a desired region into the second object by trapping, comprising the steps of:

providing a printer for printing the print data and a raster image processor associated with the printer for converting the print data into pixel data in the form of a bitmap pixel file;

transferring the print data to said printer together with trapping instructions in a print data stream, the print data stream being structured in different levels, wherein a higher the level a greater an acting scope of the instructions contained in the respective level, and trapping instructions from lower levels having priority over trapping instructions from higher levels;

using the raster image processor, converting the second object print data by rasterizing into a bitmap pixel file;

using the trapping instructions, determining an overfill for the first object relative to a color region of the second object bordering the first object at said desired region, the overfill being only determined at edges of the first object when a brightness of the first object relative to an adjoining region of the second object differs by a difference magnitude that is greater than a predetermined threshold;

using the raster image processor, rasterizing both the first object and the overfill upon insertion at said desired region of the first object and the overfill into the second object bitmap pixel file previously created by rasterizing; and printing the first and the second objects with the printer by use of the second object bitmap pixel file containing the inserted first object and the overfill at said desired region.

2. The method of claim 1 wherein screening occurs simultaneous to the insertion of the first object and the overfill into the second object bitmap pixel file.

3. The method of claim 1 wherein screening occurs after the insertion of the first object and the overfill into the second object bitmap pixel file.

4. The method of claim 1 wherein the printer has a controller and the trapping instructions are stored in the controller.

5. The method of claim 1 wherein the trapping trapping instructions are conveyed with the print data to the raster image processor.

6. The method according to claim 1 wherein the print data are stored as well as during the transfer of the first object into the second object bitmap pixel file.

7. The method according to claim 1 wherein in insertion of the first object into the second object bitmap pixel file, said desired region into which the first object is to be inserted is knocked out of the pixel file before the first object is rastered in the second object pixel file, wherein the knocked-out region is reduced corresponding to the previously determined overfill.

8. The method according to claim 7 wherein the desired region for the first object to be inserted is knocked out through all color separations given multicolor printing.

9. The method according to claim 8 wherein overfills for the individual color separations are determined and inserted separately given multicolor printing.

10. The method according to claim 1 wherein the overfill for the first object of the first object is calculated such that a lighter color extends into a region of a darker color of the second object.

11. The method according to claim 10 wherein a neutral density of the colors are compared to establish which color region is lighter.

12. The method according to claim 1 wherein a neutral density, a degree of coverage, or a luminance is used as said brightness.

13. The method according to claim 1 wherein the overfill is determined at segments of edges of the first object only when a brightness of the first object relative to a region adjoining this segment of the edge differs by a predetermined difference magnitude.

14. The method according to claim 13 wherein the brightnesses of the first object is compared with adjoining regions separately for each color separation given use of a multicolor space.

15. The method according to claim 1 wherein an overfill at the edges of the first object presented in a highlight color is always determined independent of a brightness difference relative to the adjoining region of the second object.

16. The method according to claim 1 wherein the first object presented in a highlight color is compared with a neutral density of an adjoining region of the second object, wherein a sum of neutral densities of all color separations is used for a comparison with the first object presented in highlight color.

17. The method according to claim 1 wherein the threshold lies in a range from 0 to 50%.

18. The method according to claim 1 wherein a width of the overfill is reduced given characters and lines whose stroke width lies below a first predetermined limit width.

19. The method according to claim 1 wherein the threshold lies in a range from 70% to 100% of a neutral density of black.

20. The method according to claim 1 wherein different trapping instructions for trapping are applied in a transport direction of a recoding medium on which the print data is to be printed and transverse to the transport direction.

21. The method according to claim 1 wherein a width of the overfill is not wider than 5 pixels.

22. The method according to claim 1 wherein a width of the overfill for black and opaque colorants is greater than a width of the overfill for non-black and non-opaque colorants.

23. The method according to claim 1 wherein a width of the overfill is set in a direction of verticals or in a direction of horizontals, but not in a direction of a normal relative to a boundary line between two adjoining color regions of the first and the second objects.

24. The method according to claim 1 wherein given an overfill in a region of a narrow, long vertex, the vertex does not extend beyond a width of the overfill in an X-direction or in a Y-direction relative to an outermost point of the untrapped second object.

25. The method according to claim 1 wherein the method is implemented in a print data controller of said printer.

26. The method according to claim 1 wherein the print data are transferred in a print data stream, and the print data stream references resource data that contain said trapping instructions.

27. The method according to claim 26 wherein the resource data are stored in a print data controller.

28. The method according to claim 1 wherein a complete set of said trapping instructions are stored as default values in said printer apparatus or in a print data controller.

29. The method according to claim 1 wherein a trapping instruction with which the trapping in an entire region of the highest level can be activated or deactivated is provided at the highest level.

30. The method according to claim 1 wherein print instructions at the higher levels are passed down to the lower levels.

31. The method according to claim 1 wherein the trapping instructions are executed in a printing apparatus.

32. The method according to claim 26 wherein the print data stream comprises an AFP/IPDS data stream.

33. The method according to claim 32 wherein the trapping instructions that regulate the trapping within a respective presentation space are contained in presentation spaces contained in the IPDS print data stream, and wherein the presentation spaces are arranged at different levels.

34. A system for trapping print data comprising at least first and second objects where the first object is to be inserted at a desired region into the second object by trapping, comprising:
  a printer for printing the print data and a raster image processor associated with the printer for converting the print data into pixel data in the form of a bitmap pixel file;
  the printer receiving the print data together with trapping instructions in a print data stream, the print data stream being structured in different levels, wherein a higher the level a greater an acting scope of the instructions contained in the respective level, and trapping instructions from lower levels having priority over trapping instructions from higher levels, said trapping instructions for the trapping determining an overfill for the first object relative to a color region of the second object bordering the first object at said desired region, the overfill being only determined at edges of the first object when a brightness of the first object relative to an adjoining region of the second object differs by a difference magnitude that is greater than a predetermined threshold;
  the raster image processor converting the second object print data by rasterizing into a bitmap pixel file;
  the raster image processor rasterizing both the first object and the overfill upon insertion at said desired region of the first object and the overfill into the second object bitmap pixel file previously created by rasterizing the second object print data; and
  the printer printing the first and the second objects by use of the second object bitmap pixel file containing the inserted first object and the overfill at said desired region.

* * * * *